(12) United States Patent
Shishido et al.

(10) Patent No.: US 7,761,733 B2
(45) Date of Patent: Jul. 20, 2010

(54) IMAGE-PROCESSING SYSTEM, IMAGE-PROCESSING METHOD, AND COMPUTER READABLE STORAGE MEDIUM

(75) Inventors: Rie Shishido, Kawasaki (JP); Ryu Inada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1025 days.

(21) Appl. No.: 11/369,396

(22) Filed: Mar. 7, 2006

(65) Prior Publication Data

US 2006/0200707 A1 Sep. 7, 2006

(30) Foreign Application Priority Data

Mar. 7, 2005 (JP) ............................. 2005-061733
Jan. 19, 2006 (JP) ............................. 2006-011088

(51) Int. Cl.
*G06F 11/00* (2006.01)

(52) U.S. Cl. ............................................. 714/6; 714/5

(58) Field of Classification Search ...................... 714/5, 714/6, 44
See application file for complete search history.

(56) References Cited

U.S. PATENT DOCUMENTS

| | | | | |
|---|---|---|---|---|
| 5,826,075 A * | 10/1998 | Bealkowski et al. | ......... | 713/187 |
| 6,584,559 B1 * | 6/2003 | Huh et al. | ......... | 713/2 |
| 6,771,491 B2 * | 8/2004 | Tojo et al. | ......... | 361/679 |
| 6,950,964 B1 * | 9/2005 | McMichael et al. | ......... | 714/38 |
| 6,954,929 B2 * | 10/2005 | Erickson et al. | ......... | 717/173 |
| 7,043,664 B1 * | 5/2006 | Chiloyan | ......... | 714/5 |
| 7,085,957 B2 * | 8/2006 | Sundareson et al. | ......... | 714/6 |
| 7,103,641 B2 * | 9/2006 | Brannock | ......... | 709/217 |
| 7,142,321 B2 * | 11/2006 | Tomita et al. | ......... | 358/1.15 |
| 7,145,672 B2 * | 12/2006 | Tomita et al. | ......... | 358/1.14 |
| 7,246,266 B2 * | 7/2007 | Sneed et al. | ......... | 714/27 |
| 7,284,157 B1 * | 10/2007 | McMichael et al. | ......... | 714/38 |
| 7,318,226 B2 * | 1/2008 | Chefalas et al. | ......... | 717/171 |
| 7,376,943 B2 * | 5/2008 | Lu | ......... | 717/168 |
| 7,398,331 B2 * | 7/2008 | Aoyama | ......... | 710/8 |
| 2002/0059310 A1 * | 5/2002 | Choi | ......... | 707/200 |
| 2002/0091807 A1 * | 7/2002 | Goodman | ......... | 709/221 |
| 2002/0143884 A1 * | 10/2002 | Hino et al. | ......... | 709/206 |
| 2003/0025927 A1 * | 2/2003 | Hino et al. | ......... | 358/1.13 |
| 2003/0131083 A1 * | 7/2003 | Inui et al. | ......... | 709/221 |
| 2003/0182521 A1 * | 9/2003 | Suzuki | ......... | 711/154 |
| 2004/0015952 A1 * | 1/2004 | Lajoie et al. | ......... | 717/171 |
| 2004/0068548 A1 * | 4/2004 | Sugita | ......... | 709/208 |
| 2004/0103340 A1 * | 5/2004 | Sundareson et al. | ......... | 714/6 |
| 2004/0103347 A1 * | 5/2004 | Sneed et al. | ......... | 714/32 |
| 2004/0143828 A1 * | 7/2004 | Liu et al. | ......... | 717/168 |

(Continued)

*Primary Examiner*—Robert Beausoliel
*Assistant Examiner*—Joshua P Lottich
(74) *Attorney, Agent, or Firm*—Gauthier & Connors LLP (57) ABSTRACT

An image-processing system having an image processor which performs image input or output processing, and a management communication apparatus connected to the image processor and connected via a communication line to a management center, the image processing system having: a retaining unit, provided in a nontarget apparatus which is not subjected to firmware rewriting, that retains firmware-identifying information for identifying a firmware program used before rewriting in a target apparatus which is subjected to firmware rewriting; and a controller that, in the event of failure of the firmware rewriting in the target apparatus, obtains from the management center the firmware program identified by the firmware-identifying information retained in the retaining unit and performs firmware rewriting in the target apparatus using the obtained firmware program.

9 Claims, 3 Drawing Sheets

U.S. PATENT DOCUMENTS

| | | | |
|---|---|---|---|
| 2005/0021968 A1* | 1/2005 | Zimmer et al. | 713/176 |
| 2005/0036348 A1* | 2/2005 | Aoyama | 365/49 |
| 2005/0057991 A1* | 3/2005 | Kosugiyama et al. | 365/222 |
| 2005/0076196 A1* | 4/2005 | Zimmer et al. | 713/1 |
| 2005/0158100 A1* | 7/2005 | Yamaguchi et al. | 400/62 |
| 2005/0188366 A1* | 8/2005 | Chang | 717/168 |
| 2005/0202808 A1* | 9/2005 | Fishman et al. | 455/419 |
| 2005/0203991 A1* | 9/2005 | Kawamura et al. | 709/203 |
| 2005/0223372 A1* | 10/2005 | Borchers | 717/168 |
| 2006/0112311 A1* | 5/2006 | Cobb | 714/16 |
| 2006/0130039 A1* | 6/2006 | Yuuki | 717/168 |
| 2006/0143475 A1* | 6/2006 | Herbert et al. | 713/191 |
| 2006/0156140 A1* | 7/2006 | Van Haegendoren et al. | 714/741 |
| 2006/0198653 A1* | 9/2006 | Plewnia et al. | 399/79 |
| 2008/0027587 A1* | 1/2008 | Nickerson et al. | 700/284 |

* cited by examiner

| SERIAL NUMBER OF IMAGE PROCESSOR | FW REWRITE HISTORY INFORMATION |
|---|---|
| M111111111 | FAILED FW CONFIGURATION INFORMATION 1 |
| | FAILED FW CONFIGURATION INFORMATION 2 |
| | ... |
| | SUCCEEDED FW CONFIGURATION INFORMATION 1 |
| | SUCCEEDED FW CONFIGURATION INFORMATION 2 |
| | ... |

| SERIAL NUMBER OF MANAGEMENT COMMUNICATION APPARATUS | FW REWRITE HISTORY INFORMATION |
|---|---|
| E111111111 | FAILED FW CONFIGURATION INFORMATION 1 |
| | FAILED FW CONFIGURATION INFORMATION 2 |
| | ... |
| | SUCCEEDED FW CONFIGURATION INFORMATION 1 |
| | SUCCEEDED FW CONFIGURATION INFORMATION 2 |
| | ... |

Fig. 3

IMAGE-PROCESSING SYSTEM, IMAGE-PROCESSING METHOD, AND COMPUTER READABLE STORAGE MEDIUM

PRIORITY INFORMATION

This application claims priority to Japanese Patent Applications Nos. 2005-61733 filed on Mar. 7, 2005 and 2006-11088 filed on Jan. 19, 2006, which are incorporated herein by reference in their entireties.

BACKGROUND

1. Technical Field

The present invention relates to an image-processing system having an image processor, and a management communication apparatus connected to the image processor and also connected via a communication line to a management center, and more particularly to a rewrite of firmware in the image processor or the management communication apparatus.

2. Related Art

In a known system for managing an image processor, such as a copier, a printer, a facsimile, a digital multi-function machine, or a scanner, a management center remotely controls the image processor via a communication line. The system has an optional management communication apparatus externally mounted on the image processor to send usage state information, such as the number of generated printouts and fault information, from the management communication apparatus to the management center via the communication line.

In such a system, a rewrite of firmware in the image processor or the management communication apparatus is often performed according to the following method, in consideration of recovery from a failure of the rewrite. Specifically, an apparatus to be subjected to the rewrite is provided with a storage region for storing two firmware programs consisting of old and new firmware programs, and the old firmware program is replaced with the new firmware program when the rewrite is successfully completed.

Because so-called built-in devices, such as the image processor and the management communication apparatus, have small resources, it is important to make the most effective use of the resources. In the above-described firmware rewrite method, however, two firmware programs are included in one apparatus, thereby hampering effective use of the resources.

SUMMARY

According to one aspect of the present invention, there is provided an image-processing system having an image processor which performs image input or output processing, and a management communication apparatus connected to the image processor and connected via a communication line to a management center, the image processing system having: a retaining unit, provided in a nontarget apparatus which is not subjected to firmware rewriting, that retains firmware-identifying information for identifying a firmware program used before rewriting in a target apparatus which is subjected to firmware rewriting; and a controller that, in the event of failure of the firmware rewriting in the target apparatus, obtains from the management center the firmware program identified by the firmware-identifying information retained in the retaining unit and performs firmware rewriting in the target apparatus using the obtained firmware program.

According to another aspect of the present invention, there is provided a method used in an image-processing system having an image processor which performs image input and output processing, and a management communication apparatus connected to the image processor and connected via a communication line to a management center, the method having: retaining, in a nontarget apparatus which is not subjected to firmware rewriting, firmware-identifying information for identifying a firmware program used before the firmware rewriting in a target apparatus which is subjected to firmware rewriting, and causing a controller to perform, in the event of failure of the firmware rewriting in the target apparatus, control operation to obtain the firmware program identified by the retained firmware-identifying information from the management center and perform firmware program rewriting in the target apparatus using the obtained firmware program.

According to another aspect of the present invention, there is provided a storage medium readable by a computer, the storage medium storing a program of instructions executable by the computer to perform a function for recovering from a firmware rewrite failure in an image-processing system having an image processor which performs image input or output processing and a management communication apparatus connected to the image processor and connected via a communication line to a management center, the function having: retaining, in a nontarget apparatus which is not subjected to firmware rewriting, firmware-identifying information for identifying a firmware program used before the firmware rewriting in a target apparatus which is subjected to firmware rewriting, an causing a controller to perform, in the event of failure of the firmware rewriting in the target apparatus, control operation to obtain the firmware program identified by the retained firmware-identifying information from the management center and perform firmware program rewriting in the target apparatus using the obtained firmware program.

BRIEF DESCRIPTION OF THE DRAWINGS

Embodiments of the present invention will be described in detail by reference to the following figures, wherein.

DETAILED DESCRIPTION

Embodiments of the present invention will next be described with reference to the drawings.

Embodiment 1

Figure 1:
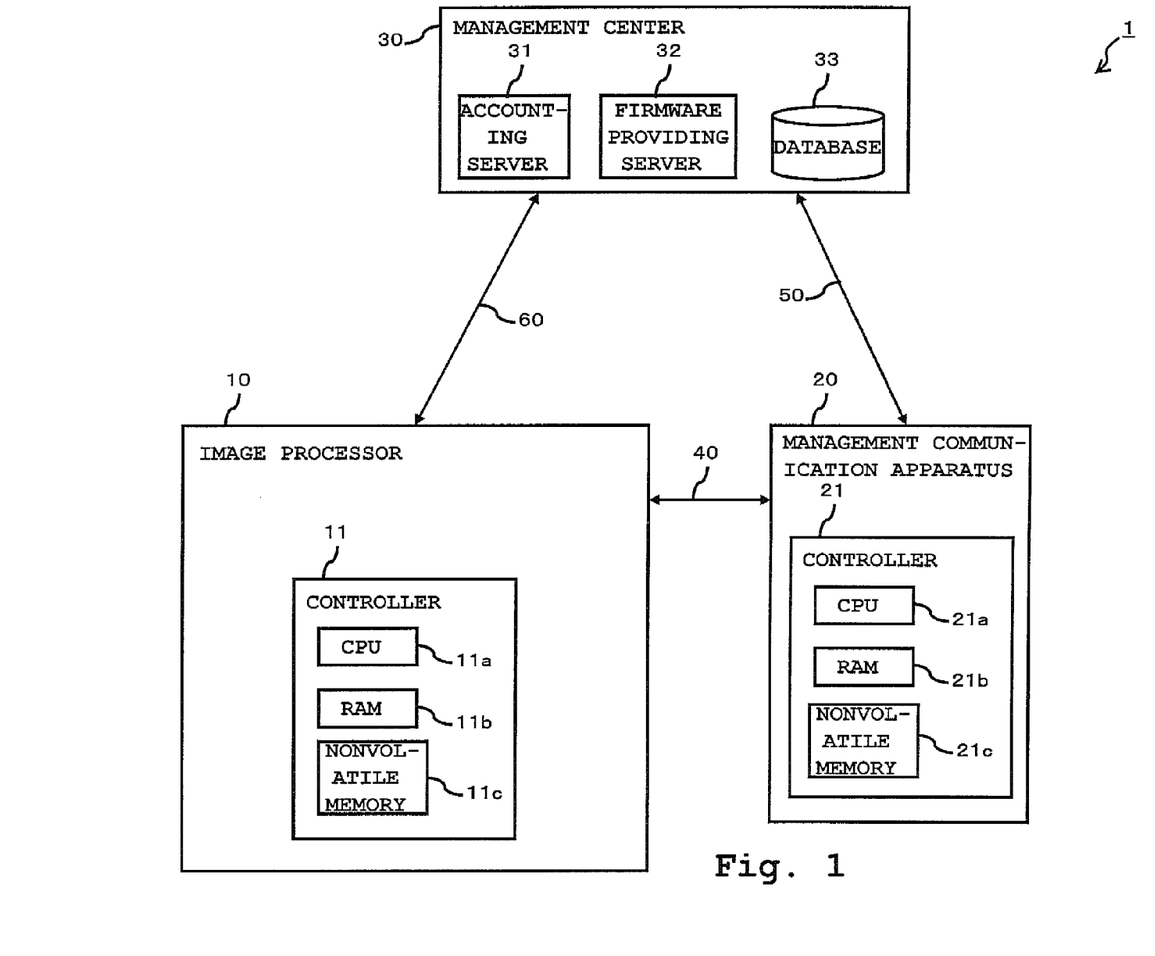
FIG. 1 is a block diagram showing the configuration of an image-processing system according to an embodiment of the present invention.

FIG. 1 is a block diagram showing the configuration of an image-processing system 1 according to a first embodiment of the present invention. In FIG. 1, the image-processing system 1 has an image processor 10, a management communication apparatus 20, and a management center 30.

The image processor 10 performs image input or output processing. Specifically, the image processor 10 is an apparatus, such as, for example, a copier, a printer, a facsimile, a digital multi-function machine, or a scanner, having at least one of an image-forming function of forming an image on a recording medium, such as paper, and an image-reading function of reading an image from a source document.

The image processor 10 has a controller 11 which controls the entire image processor 10. The controller 11 is a circuit board containing a CPU (Central Processing Unit) 11a, RAM (Random Access Memory) 11b, a nonvolatile memory 11c, and other components. The nonvolatile memory 11c stores firmware which is executed by the CPU 11a to realize overall control of the image processor.

Here, because the nonvolatile memory 11c is a rewritable memory, such as an EEPROM (Electrically Erasable Programmable Read-Only Memory), the firmware is also rewritable. A firmware program is configured to include an OS (Operating System) and one or more application software programs (hereinafter referred to as "applications"). The applications include, for example, driver software for controlling a hardware device (such as a print engine or an optional device), software associated with network setting, and the like.

The management communication apparatus 20 is an optional device for enabling remote management of the image processor 10 and is externally attached to the image processor 10 in response to a user demand for a remote management service. It should be noted that because the remote management service is an optional service to be rendered in accordance with user demand, a function of obtaining the remote management service is not incorporated in the image processor 10 itself.

The management communication apparatus 20 is connected to the image processor 10 via a communication cable 40 and is connected to the management center 30 via a communication line 50, such as a telephone line or the Internet. Further, the management communication apparatus 20 obtains, from the image processor 10, usage state information of the image processor 10 and sends the obtained information to the management center 30. Here, the usage state information includes various types of information used for controlling the image processor 10, such as, for example, information on the number of printouts (a meter count), failures, paper, consumable items, and operation status.

The management communication apparatus 20 has a controller 21 which controls the entire management communication apparatus. The controller 21 is a circuit board containing a CPU 21a, RAM 21b, a nonvolatile memory 21c, and other components. The nonvolatile memory 21c stores firmware which is executed by the CPU 21a, to thereby realize overall control of the management communication apparatus.

Here, because the nonvolatile memory 21c is a rewritable memory, such as an EEPROM, the firmware is also rewritable. In addition, the firmware is configured to include an OS and one or more applications.

The management center 30 is a computer system which remotely controls the image processor 10 via the management communication apparatus 20 over the communication line 50, and includes an accounting server 31, a firmware-providing server 32, and a database 33.

The accounting server 31 receives from the management communication apparatus 20 a meter count in the image processor 10 and performs predetermined accounting processing in accordance with the meter count. The firmware-providing server 32 provides firmware programs for the image processor 10 and the management communication apparatus 20. Further, the firmware-providing server 32 performs various processing operations associated with a firmware rewrite to be described later. The database 33 stores history information relating to the firmware rewrite.

In the example of configuration shown in FIG. 1, the image processor 10 and the management center 30 are connected with each other via a communication line 60, such as a telephone line or the Internet. This connection, however, may be omitted.

Although FIG. 1 shows only one pair consisting of the image processor 10 and the management communication apparatus 20, more than one pair may be provided. Further, connection between the image processor 10 and the management communication apparatus 20 is not limited to wired connection, but may be wireless.

In the image-processing system 1 configured as described above, the firmware program in the image processor 10 or the management communication apparatus 20 is rewritten as described below. Here, one of the image processor 10 and the management communication apparatus 20 which is subjected to a firmware rewrite is referred to as a "target apparatus," and the other one of the image processor 10 and the management communication apparatus 20 which is not subjected to the firmware rewrite is referred to as a "nontarget apparatus."

Prior to the firmware rewrite, the nontarget apparatus obtains, from the target apparatus, firmware-identifying information for identifying a firmware program used before the rewrite (i.e. used at the present time) and retains the obtained information. As the firmware-identifying information there may be used, for example, configuration or version information of the firmware program, or a combination of the configuration or version information and a model code. Here, the configuration information of the firmware program includes information on each version of the OS and one or more applications constituting the firmware program.

Next, the target apparatus or the nontarget apparatus obtains from the management center 30 a firmware program for use in rewriting (for example, the latest version of the firmware program) over the appropriate communication line, and rewrites the firmware program in the target apparatus to the obtained firmware program for use in rewriting. More specifically, when the image processor 10 is the target apparatus, the image processor 10 may download the firmware program from the management center 30 via the communication line 60 to perform the rewrite in one example. In another example, the image processor 10 may download the firmware program from the management center 30 via the communication cable 40, the management communication apparatus 20, and the communication line 50 to perform the rewrite. Further, in still another example, the management communication apparatus 20 may download the firmware program via the communication line 50 from the management center 30 to rewrite the firmware program in the image processor 10. It should be noted that the firmware rewrite includes an overall rewrite of the firmware program and a partial rewrite of the firmware program. For the partial rewrite, a part of the firmware program in question may be downloaded from the management center 30.

If the above-described rewrite of the firmware program fails, the nontarget apparatus obtains, via the appropriate communication line from the management center 30, the firmware program which has been used before the rewrite, on the basis of the firmware-identifying information retained in the nontarget apparatus, and restores the firmware program which has been used before the rewrite to the target apparatus. In other words, in the event of failure of the firmware rewrite, the nontarget apparatus restores the firmware program of the target apparatus.

The failure of the firmware rewrite includes, in addition to a failure of rewrite itself due to a line defect or a power interruption, a situation in which an expected function of the firmware program for use in rewriting is not provided, such as runaway crashing due to a firmware bug.

The nontarget apparatus can detect the failure of the rewrite by means of an appropriate method. With a configuration in which a success report is sent from the target apparatus to the nontarget apparatus upon successful rewrite, for example, the nontarget apparatus may determine a failure of the rewrite upon expiration of a predetermined period of time unless the success report is received. Alternatively, with another configuration in which an error report is sent from the target apparatus to the nontarget apparatus upon failure in the rewrite, the nontarget apparatus may detect the failure of the rewrite by receiving the error report.

In the above configurations, histories of rewrite failure may be accumulated in the management center 30 to facilitate tracking down of the cause of rewrite failure, so that countermeasures to prevent the failure can be taken quickly. In terms of such countermeasures, the nontarget apparatus desirably sends, to the management center 30, failed firmware identifying information for identifying the firmware program for use in rewriting which has failed to be properly rewritten. As the failed firmware-identifying information, there may be used configuration or version information of the firmware program in question, or a combination of the configuration or version information and a model code.

Further, in view of quick countermeasures to prevent the failure, the management center 30 desirably corrects the firmware program for use in rewriting using a predetermined firmware correction algorithm based on the failed firmware-identifying information.

In a favorable form, both the image processor 10 and the management communication apparatus 20 may function as the nontarget apparatus as described above. More specifically, either one of the image processor 10 and the management communication apparatus 20 may restore the firmware program of the other one of the image processor 10 and the management communication apparatus 20 in the event of failure in rewriting the firmware program of the other one. Alternatively, only one of the image processor 10 and the management communication apparatus 20 may be configured to function as the nontarget apparatus.

Figure 2:
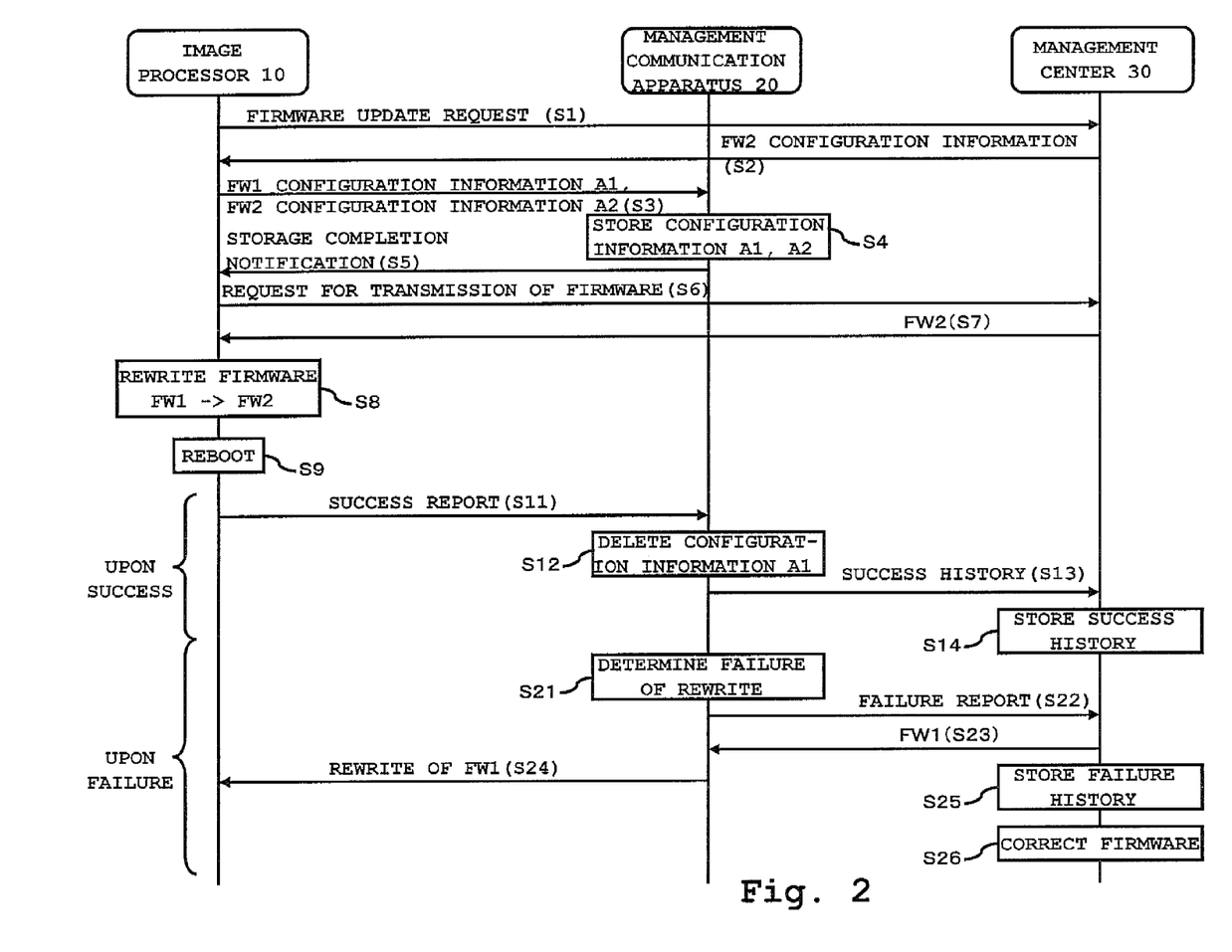
FIG. 2 is a sequence diagram showing an operation procedure of the image-processing system for rewriting firmware of an image processor.

FIG. 2 is a sequence diagram showing an operation procedure of the image-processing system 1 when rewriting the firmware program in the image processor 10. Using an example in which the firmware program in the image processor 10 is rewritten in accordance with a sequence shown in FIG. 2, operation of the image-processing system 1 will be specifically described below.

In the below description, it is assumed that the image processor 10 initially stores an earlier version of a firmware program, called FW1. On the other hand, it is assumed that a latest version of a firmware program, called FW2, is provided to the management center 30.

In accordance with an instruction from a user, the image processor 10 sends a firmware update request via the communication line 60 to the management center 30 (S1). Alternatively, the image processor 10 automatically sends a firmware update request via the communication line 60 to the management center 30 at an appropriate point in time, such as a time immediately after the power is turned on. At this time, the image processor 10 sends configuration information A1 of the present firmware program FW1 to the management center 30.

Upon receipt of the firmware update request from the image processor 10, by reference to the configuration information A1 provided from the image processor 10 the management center 30 determines whether or not an update firmware program exists. Here, it is assumed that the presence of an update firmware program FW2 is determined, and the management center 30 sends, via the communication line 60 to the image processor 10, configuration information A2 of the firmware program FW2 for use in rewriting (S2). If the image processor 10 already has the firmware program FW2, a firmware program to be updated is determined to be absent. This determination is sent from the management center 30 to the image processor 10, and processing associated with the firmware rewrite is terminated.

Upon receipt of the configuration information A2 from the management center 30, the image processor 10 sends, prior to the firmware rewrite, both the configuration information A1 of the firmware program FW1 and the configuration information A2 of the firmware program FW2 via the communication cable 40 to the management communication apparatus 30 (S3).

Then, upon receipt of the configuration information A1 and A2 from the image processor 10, the management communication apparatus 30 stores the received configuration information in an internal memory (S4) and notifies the image processor 10 that storage has been completed (S5).

After receiving the notification of storage completion from the management communication apparatus 30, the image processor 10 sends a request for transmission of the firmware program FW2 via the communication line 60 to the management center 30 (S6).

Upon receipt of the request for transmission of the firmware program FW2 from the image processor 10, the management center 30 sends the firmware program FW2 via the communication line 60 to the image processor 10 (S7).

The image processor 10 receives the firmware program FW2 from the management center 30 and rewrites the firmware program FW1 of the image processor 10 using the firmware program FW2 (S8). Then, upon completion of the rewrite, the image processor 10 is rebooted (S9). Operation subsequent to the rebooting will be separately described with respect to processing steps performed upon successful completion of the rewrite and processing steps performed upon failure of the rewrite.

(Processing Steps Performed Upon Successful Completion of Firmware Rewrite)

After the rebooting, the image processor 10 properly starts up and notifies the management communication apparatus 20 via the communication cable 40 that the rewrite has succeeded (S11).

After receiving from the image processor 10 notification that the rewrite has succeeded, the management communication apparatus 20 deletes the configuration information A1 of the firmware program FW1 from the internal memory (S12). In addition, the management communication apparatus 20 sends the configuration information A2 of the firmware program FW2 which has succeeded in rewriting as a success history to the management center 30 via the communication line 50 (S13).

Figure 3:
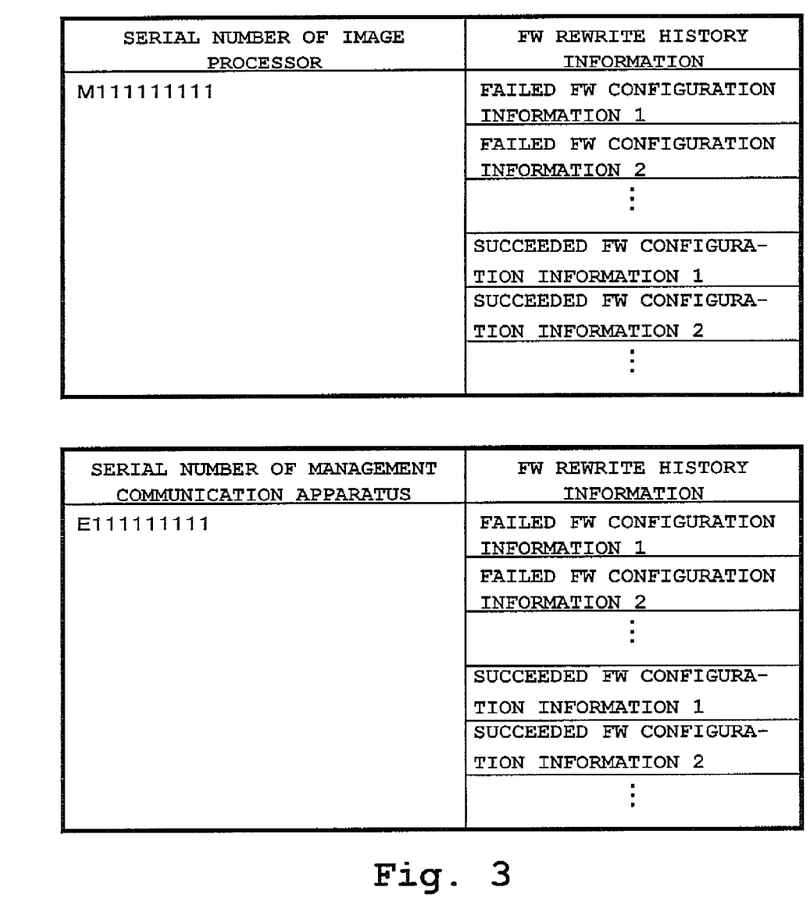
FIG. 3 shows an example of history information stored in a database.

Upon receipt of the configuration information A2 from the management communication apparatus 20, the management center 30 stores the received configuration information A2 in the database 33 as successful FW configuration information (S14). For example, the successful FW configuration information is stored in connection with a serial number of the image processor 10 as shown in FIG. 3.

(Processing Steps Performed Upon Failure of Firmware Rewrite)

After the rebooting, the image processor 10 is not able to start up. As a result, the management communication apparatus 20 is not notified of the successful completion of the rewrite. If a predetermined time elapses without receiving a notification of the success of the rewrite after the storage completion is notified in step S5, the management communication apparatus 20 determines that the firmware rewrite has failed (S21). Then, the management communication apparatus 20 notifies the management center 30 via the communication line 50 that the firmware rewrite has failed (S22). Here, in order to obtain the firmware program FW1 used before the rewrite, the management communication apparatus 20 retrieves the configuration information A1 of the firmware program FW1 from the internal memory and sends the retrieved information to the management center 30. Further, the management communication apparatus 20 retrieves the configuration information A2 of the firmware program FW2 from the internal memory and sends the retrieved information as failed firmware identifying information to the management center 30.

After receiving the notification of failure from the management communication apparatus 20, the management center 30 sends the firmware program FW1 according to the received configuration information A1 to the management communication apparatus 20 over the communication line 50 (S23). Upon receipt of the firmware program FW1 from the management center 30, the management communication apparatus 20 writes the firmware program FW1 in the image processor 10 to thereby restore the image processor 10 (S24).

Subsequent to step S23, the management center 30 further stores in the database 33 the configuration information A2 received from the management communication apparatus 20 as failed FW configuration information (S25). For example, the failed FW configuration information is stored in connection with the serial number of the image processor 10 as shown in FIG. 3. Further, the failed FW configuration information may be stored also in connection with the configuration information A1 of the previous firmware program FW1 used before the rewrite, because configuration information of the previous firmware program can constitute history information useful for tracking down the cause of failure.

Further, the management center 30 corrects the firmware program for use in rewriting on the basis of the failed firmware-identifying information (configuration information A2) by means of a predetermined firmware correction algorithm (S26). The firmware program obtained through the correction is defined as a new firmware program FW3 for use in rewriting, which will be used in place of the firmware program FW2. From then on, if a firmware update request accompanied by the configuration information A1 is received from the image processor which has failed in rewriting or from another image processor, the management center 30 sends configuration information A3 of the firmware program FW3 to the image processor in question, and subsequently sends the firmware program FW3. Accordingly, the firmware program in the image processor is rewritten not with the firmware program FW2 which has failed in rewriting, but with the corrected firmware program FW3.

Here, a brief example of firmware correction performed in step S26 will be described. It is assumed that the firmware program FW2 whose configuration is identified by the configuration information A2 is configured with an OS 2 and an application 2. The management center 30 has applications 3 to 10 which differ in version from the application 2 and have been prepared in advance. The management center 30 combines the OS 2 and the application 3 to generate a firmware program and debugs the generated firmware program by means of an emulator and a debugger. As a result, the generated firmware program is defined as the new firmware program FW3, so long as no bug is detected during the debugging. On the other hand, if a bug is detected, the generated firmware program is not defined as the firmware program FW3. Then, the management center 30 sequentially performs similar processing on the other applications 4 to 10 until a bug-free firmware program is generated.

Although operation for rewriting the firmware program in the image processor 10 has been described up to this point, operation for rewriting the firmware program in the management communication apparatus 20, which will be described below, is similar to the above-described operation. More specifically, the management communication apparatus 20 operates in a manner similar to the above-described operation of the image processor 10, while the image processor 10 operates in a manner similar to the above-described operation of the management communication apparatus 20. The management center 30 provides a firmware program for use in rewriting to the management communication apparatus 20 and stores, in the database 33, the history information on the firmware rewrite in the management communication apparatus 20. In the database 33, for example, the failed FW configuration information is stored as a failure history in connection with the serial number of the management communication apparatus 20, and the successful FW configuration information is stored as a success history in connection with the serial number of the management communication apparatus 20 as shown in FIG. 3.

In the present embodiment, the firmware-identifying information for identifying the previous firmware program having been used before the rewrite in the target apparatus is retained in the nontarget apparatus as described above. In response to a failure of the firmware rewrite in the target apparatus, the previous firmware program identified by the retained firmware-identifying information is obtained from the management center 30 to rewrite the firmware program of the target apparatus to the obtained previous firmware program. Specifically, when the firmware program of the image processor 10 or the management communication apparatus 20 is rewritten, before initiating the rewrite, the nontarget apparatus obtains, from the target apparatus, the firmware-identifying information for identifying the firmware program having been used in the target apparatus before the rewrite and retains the obtained firmware-identifying information. Further, in the event of failure of the firmware rewrite, the nontarget apparatus obtains the firmware program used before the rewrite, via the communication line from the management center 30 by reference to the retained firmware-identifying information, to restore the firmware program of the target apparatus to the state before the rewrite. Thus, according to the present embodiment, recovery from a rewrite failure can be performed without allocating a storage region for storing the two firmware programs of old and new to a single apparatus. Namely, the recovery from a failure in rewriting the firmware program of the image processor 10 or the management communication apparatus 20 can be realized even with a smaller amount of resources. In other words, because loading two firmware programs in one apparatus is not necessary, the resources of the image processor 10 or the management communication apparatus 20 can be used more efficiently.

Further, in the present embodiment, when the firmware rewrite fails, the nontarget apparatus sends, to the management center 30, the failed firmware-identifying information for identifying the firmware program used in the rewrite which has failed. As a result, history information on rewrite failure can be accumulated in the management center 30, thereby enabling easy tracking of conditions of the rewrite failure. In addition, accumulation of past cases can facilitate analytical judgment on a failure occurring during a rewrite. In addition, an attempt to attain a solution to a rewrite failure can be accelerated.

Still further, according to the present embodiment, the management center 30 automatically reorganizes a firmware configuration which allows a bug-free rewrite, on the basis of the received failed firmware-identifying information. To this end, in the event that a firmware program for use in rewriting fails to be rewritten, the firmware program for use in rewriting is corrected for generating a new firmware program to be used in the rewrite, which can produce an effect of preventing similar rewrite failure. In other words, the solution to the failure of the firmware rewrite can be speedily attained.

Embodiment 2

A second embodiment is an example of a method for detecting a firmware rewrite failure. Detection of the firmware rewrite failure according to the present embodiment will be described below. It should be noted that components similar to those in Embodiment 1 are identified by the same reference numerals as used in Embodiment 1, and repeated descriptions related to the components are omitted.

(Operation to Rewrite Firmware of Image Processor)

Similar to the case of Embodiment 1, prior to a firmware rewrite, the management communication apparatus 20 receives the configuration information from the image processor 10 and stores the received configuration information in the internal memory, and then notifies the image processor 10 of completion of the storage.

In the present embodiment, after notifying completion of the storing, the management communication apparatus 20 initiates time measurement by means of a timer (not illustrated).

Thereafter, if the firmware rewrite succeeds, the image processor 10 reboots itself and properly starts up. Because, in the present embodiment, the image processor 10 and the management communication apparatus 20 are connected via a serial communication cable, normal startup of the image processor 10 causes state transition of a signal line in the serial communication cable to a predetermined state (a high level, a low level, or a high impedance state). On the other hand, if the firmware rewrite fails, the image processor 10 is unable to start up, and the state transition of the signal line to the above-described predetermined state does not occur.

The management communication apparatus 20 monitors the state of the signal line, and determines that the firmware rewrite has succeeded when the state transition of the signal line is detected by the time a timer measurement time reaches a predetermined time-out period. On the other hand, when no state transition of the signal line is detected by the time the timer measurement time reaches the predetermine time-out period, the management communication apparatus 20 determines that the firmware rewrite has failed.

(Operation to Rewrite Firmware of Management Communication Apparatus)

Similar to the case of Embodiment 1, prior to the firmware rewrite, the image processor 10 obtains configuration information from the management communication apparatus 20 and stores the obtained configuration information in the internal memory, and then notifies the management communication apparatus 20 of completion of the storage.

After notifying the completion of the storing, the image processor 10 initiates time measurement using a timer (not illustrated), while successively sending a reboot signal to the management communication apparatus 20 at regular time intervals.

When the firmware rewrite succeeds, the management communication apparatus 20 is restarted according to the reboot signal sent from the image processor 10, and properly starts up. Normal startup of the management communication apparatus 20 causes the state transition of the signal line in the serial communication cable to a predetermined state (a high level, a low level, or a high impedance state). On the other hand, when the firmware rewrite fails, the management communication apparatus 20 is unable to start up, thereby causing no state transition of the signal line to the predetermined state.

The image processor 10 monitors the state of the signal line, and determines that the firmware rewrite has succeeded when the state transition of the signal line is detected by the time a timer measurement time reaches a predetermined time-out period. On the other hand, when no state transition of the signal line is detected by the time the timer measurement time reaches the predetermine time-out period, the image processor 10 determines that the firmware rewrite has failed.

In the present embodiment described above, the predetermined time-out period is greater than or equal to a length of time required to rewrite the firmware program, and desirably the predetermined time-out period is slightly longer than the time required to rewrite the firmware program. Although the time-out period may be a fixed time which has been set in advance, more desirably the time-out period be a length of time which is specified in accordance with capacity of the firmware program or the like and notified from the management center 30 to the nontarget apparatus. To rewrite the firmware program of the image processor 10, the management center 30 notifies the management communication apparatus 20 of the time-out period in a manner as described below, for example. In a processing step of sending to the image processor 10 the configuration information of the firmware program for use in rewriting, the management center 30 also sends the time-out period to the image processor 10 in addition to the configuration information. Then, in a process of sending the configuration information of the firmware programs running at present and to be used in rewriting to the management communication apparatus 20, the image processor 10 also sends the above-described time-out period to the management communication apparatus 20 in addition to the configuration information of the firmware programs. In this case, the time-out period may be preset in the database of the management center 30, or may be calculated by the management center 30. Presetting or calculation of the time-out period is performed in accordance with the volume of the firmware program for use in rewriting, an actual record of past rewriting time periods collected from a large number of image processors 10, or the like. The description about the time-out period provided here is similarly applied to other embodiments which will be described later.

Although in the above-described embodiment the reboot signal is successively sent at constant time intervals, the reboot signal may be sent at other timings. For example, the image processor 10 may send the reboot signal at the time when the timer measurement time reaches the time-out period. In this case, the image processor 10 determines success or failure of the firmware rewrite according to whether or not the state transition of the signal line is detected within a predetermined time after sending the reboot signal.

Although in the above-described configuration the image processor 10 reboots itself, the image processor 10 may be rebooted in accordance with the reboot signal from the management communication apparatus 20. Further, the management communication apparatus 20 may reboot itself.

Embodiment 3

A third embodiment is another example of the method for detecting a firmware rewrite failure. Detection of the firmware rewrite failure according to this embodiment will be described below. In the description below, components similar to those in Embodiment 1 are identified by the same reference numerals as those used in Embodiment 1, and repeated descriptions related to the components are omitted.

In the rewrite of the firmware program of the image processor 10, prior to the firmware rewrite, the management communication apparatus 20 obtains the configuration information from the image processor 10 and stores the obtained configuration information in the internal memory, and then notifies the image processor of completion of the storage, as in the case of Embodiment 1.

After notifying the completion of the storage, the management communication apparatus 20 starts time measurement using the non-illustrated timer. In the present embodiment, the image processor 10 and the management communication apparatus 20 are connected over a local area network (LAN), such as Ethernet (registered trademark), and when the timer measurement time exceeds the predetermined time-out period, the management communication apparatus 20 sends a query packet via the LAN to the image processor 10.

When the firmware rewrite succeeds, the image processor 10 reboots itself and properly starts up. Then, upon receipt of the above-described query packet, the image processor 10 sends a response packet back to the management communication apparatus 20. On the other hand, when the firmware rewrite fails, the image processor 10 is unable to start up, resulting in no response packet being transmitted.

If the response packet is returned from the image processor 10 within a predetermined time period after the query packet is sent, the management communication apparatus 20 determines that the firmware rewrite has succeeded, whereas if no response packet is returned, the management communication apparatus 20 determines that the firmware rewrite has failed.

Although operation for rewriting the firmware program in the image processor 10 has been described, operation for rewriting the firmware program in the management communication apparatus 20 may be performed in a similar manner.

Embodiment 4

An image-processing system according to a fourth embodiment has a structure substantially identical with that of the image-processing system in Embodiment 1, except that the management center 30 is adapted to detect the firmware rewrite failure and perform recovery from the rewrite failure. An image-processing system according to the present embodiment will now be described. In the description below, components similar to those in Embodiment 1 are identified by the same reference numerals as used in Embodiment 1, and repeated descriptions related to the components are omitted.

According to the present embodiment, when the firmware program in the image processor 10 is rewritten, upon receipt of a request for transmission of the firmware program from the image processor 10, the management center 30 initiates transmission of the firmware program for use in rewriting to the image processor 10 and starts time measurement using the non-illustrated timer.

Then, upon succeeding in rewriting the firmware program, the image processor 10 reboots itself and properly starts up, and then notifies the management center 30 that the rewrite has been completed, over the communication line 60 or via the management communication apparatus 20. On the other hand, when the rewrite fails, the image processor 10 is unable to start up, thereby providing no notification of completion of the rewrite.

If the notification is received by the time a timer measurement time reaches a predetermined time-out period, the management center 30 determines success of the firmware rewrite, whereas if the notification is not received, the management center 30 determines failure of the firmware rewrite.

In a case where the failure of the firmware rewrite is determined, the management center 30 obtains the configuration information of the previous firmware program retained in the management communication apparatus 20 and initiates processing to rewrite the firmware program in the image processor 10 to the previous firmware program used before the rewrite based on the obtained configuration information. Further, the management center 30 stores the obtained configuration information as history information in the database 33.

Although operation for rewriting the firmware program in the image processor 10 has been described, operation for rewriting the firmware program in the management communication apparatus 20 may be performed in a similar manner.

As can be seen in the present embodiment, an apparatus other than the nontarget apparatus, such as the management center 30, may be configured to detect the firmware rewrite failure and perform the recovery from the rewrite failure. According to the present embodiment, a controller in the management center 30 obtains, from a storage apparatus in the management center 30, the firmware program identified by the firmware identifying information stored in the nontarget apparatus and controls the rewrite of the firmware program in the target apparatus using the obtained firmware program. With this configuration, a resource used for determining the rewrite failure or performing the recovery can be eliminated or reduced from the resources of the image processor 10 or the management communication apparatus 20, thereby preventing or suppressing an increase of the resources in the image processor 10 or the management communication apparatus 20.

Although in the present embodiment the management center 30 performs both detection of the rewrite failure and recovery from the rewrite failure, the management center 30 may be configured to perform either one of the detection of the rewrite failure and the recovery from the rewrite failure while the nontarget apparatus is configured to perform the other one of the detection and the recovery. Upon detecting the rewrite failure, for example, the management center 30 may send the firmware program used before the rewrite to the nontarget apparatus, and the nontarget apparatus may rewrite the firmware program in the target apparatus. Alternatively, upon detecting the rewrite failure, for example, the nontarget apparatus may send, to the management center 30, a notification of the detection along with the stored configuration information of the firmware program. Then, the management center 30 may perform the firmware rewrite on the target apparatus on the basis of the provided configuration information and store the provided configuration information in the database 33.

Embodiment 5

An image-processing system according to a fifth embodiment of the present invention has a structure substantially identical with that of the image-processing system according to Embodiment 1, except that the management center 30 performs a recovery procedure in accordance with a degree of a fault due to the failure of the firmware rewrite. The image-processing system according to the present embodiment will now be described. In the description below, components similar to those in Embodiment 1 are identified by the same reference numerals as those in Embodiment 1, and repeated descriptions related to the components are omitted.

According to the present embodiment, when the firmware program in the image processor 10 is rewritten, in a process step of sending the configuration information of the firmware programs running at present and to be used in rewriting to the management communication apparatus 20 prior to the firmware rewrite, the image processor 10 sends unit configuration information of the image processor 10 to the management communication apparatus 20 in addition to the configuration information of the firmware programs. Here, the unit configuration information refers to information which represents a configuration of units in the image processor 10, including information as to whether or not an optional unit, such as a finisher or a large-capacity tray, is present, for example. The management communication apparatus 20 retains the unit configuration information of the image processor 10 in addition to the configuration information of the firmware programs running at present and to be used in rewriting.

According to the present embodiment, the degree of the fault due to the firmware rewrite failure is classified into three levels of minor, moderate, and major faults, and the recovery procedure is performed in accordance with the level of the fault. The minor level refers to a fault to a degree that some of the functions of the image processor 10 (such as a finisher function) other than basic functions thereof (a copying function, a printing function, or a scanning function) are unusable, while the basic functions are usable. The moderate level represents a fault to a degree that a non-illustrated display unit (such as a control panel) of the image processor 10 is operable, whereas the basic functions of the image processor 10 are disabled. The major level represents a fault to a degree that the image processor 10 is unable to start up.

Next, operation of the image-processing system according to the present embodiment will be described separately with respect to cases of the minor fault, moderate fault, and major fault.

(Minor Fault)

Here, it is assumed as the minor fault that the finisher function becomes unusable due to the firmware rewrite. When the minor fault of the unusable finisher function is detected through the self-diagnostic function after finishing the firmware rewrite, the image processor 10 sends fault information representing details of the fault to the management communication apparatus 20. Upon receipt of the fault information from the image processor 10, the management communication apparatus 20 sends to the management center 30 the stored configuration information of the firmware programs used before the rewrite and at the rewrite and the unit configuration information in addition to the received fault information.

Upon receipt of the fault information, the configuration of the firmware programs, and the unit configuration information from the management communication apparatus 20, the management center 30 recognizes the occurrence of a minor level of fault according to the fault information and performs the recovery procedure in accordance with the minor level of fault. Specifically, the management center 30 selects an appropriate firmware program to be used in recovery on the basis of the fault information, the configuration information of the firmware programs used before the rewrite and at the rewrite, and the unit configuration information received from the management communication apparatus 20. Then, the management center 30 rewrites the firmware program in the image processor 10 via the communication line 60 or the management communication apparatus 20 using the selected firmware program selected for the recovery.

Here, in addition to the firmware program used before the rewrite, another version of the firmware program obtained by improving the firmware program (which has failed in rewriting) used at the rewrite may be used as the firmware program for the recovery. Desirably, the management center 30 stores, as history information relating to the firmware rewrite, the configuration information of the firmware programs used before the rewrite and at the rewrite, the unit configuration information of the target apparatus, and information on success/failure of the rewrite in a state associated with each other in the database 33. Then, on the basis of the history information, the management center 30 selects an appropriate firmware program to be used in recovery. In other words, the management center 30 selects the firmware program for the recovery on the basis of the information as to which version of the firmware program is used when the rewrite succeeds/fails and which unit configuration is associated with that version of the firmware program.

Although the configuration in which the image processor 10 performs self-diagnostic procedures has been described above, the management communication unit 20 may be configured to diagnose the image processor 10.

In this case of the minor level of fault, the management center 30 may resume the firmware rewrite immediately after the occurrence of the fault, or may wait until an improved version of the firmware program is prepared to perform the firmware rewrite using the improved version of the firmware program.

(Moderate Fault)

When a fault in the basic functions being disabled is detected by means of the self-diagnostic function after completion of the firmware rewrite, the image processor 10 sends fault information representing details of the fault to the management communication apparatus 20. Upon receipt of the fault information from the image processor 10, the management communication apparatus 20 sends to the management center 30 the retained configuration information of the firmware programs used before the rewrite and at the rewrite and the unit configuration information along with the fault information.

Upon receipt of the fault information and the configuration information from the management communication apparatus 20, the management center 30 recognizes the occurrence of a moderate level of fault on the basis of the fault information and performs the recovery procedure in accordance with the moderate level of fault. More specifically, the management center 30 generates information (such as code information) regarding countermeasures against the fault on the basis of the fault information, the configuration information of the firmware programs used before the rewrite and at the rewrite, and the unit configuration information received from the management communication apparatus 20 and sends the generated information to the management communication apparatus 20. Upon receipt of the information regarding the countermeasures from the management center 30, the management communication apparatus 20 displays the received information on a display of the image processor 10. According to the display, recovery operation is performed by a user. As the recovery operation, there may be named turning on/off of the image processor 10, extraction and insertion of a toner cartridge, detachment and attachment of the finisher, and the like.

Although the configuration in which the image processor 10 performs the self-diagnostic procedure has been described above, the management communication apparatus 20 may be configured to diagnose the image processor 10. Further, the management center 30 may cause the image processor 10 to display the information regarding the countermeasures on the display of the image processor 10 via the communication line 60.

(Major Fault)

When no notification is provided from the image processor 10 within a predetermined time-out period after the firmware rewrite is initiated, the management communication apparatus 20 sends to the management center 30 fault information representing no provision of notification along with the retained configuration information of the firmware programs used before the rewrite and at the rewrite and the unit configuration information.

Upon receipt of the fault information and the configuration information from the management communication apparatus 20, the management center 30 recognizes the occurrence of a major level of fault on the basis of the received fault information and launches a recovery procedure in accordance with the major level of fault. Namely, the management center 30 reports the occurrence of the major level of fault to a customer engineer (CE) for the image processor 10 in which the fault occurs. More specifically, the management center 30 generates information regarding recovery operation on the basis of the fault information, the configuration information of the firmware programs used before the rewrite and at the rewrite, and the unit configuration information received from the management communication apparatus 20. Subsequently, the management center 30 provides a notification of the occurrence of the major level of fault to a PC (personal computer) terminal or a mobile telephone of the CE while sending the information for recovery. Upon receipt of the notification, the CE performs the recovery operation according to the received information for recovery.

Although operation for rewriting the firmware program of the image processor 10 has been described, operation for rewriting the firmware program of the management communication apparatus 20 may be performed in a similar manner.

According to an aspect of the present invention, there is provided an image-processing system having an image processor which performs image input or output processing, and a management communication apparatus connected to the image processor and connected via a communication line to a management center, the image processing system having: a retaining unit, provided in a nontarget apparatus which is not subjected to firmware rewriting, that retains firmware-identifying information for identifying a firmware program used before rewriting in a target apparatus which is subjected to firmware rewriting; and a controller that, in the event of failure of the firmware rewriting in the target apparatus, obtains from the management center the firmware program identified by the firmware-identifying information retained in the retaining unit and performs firmware rewriting in the target apparatus using the obtained firmware program.

According to another aspect of the present invention, the image-processing system may further include a sending unit in the nontarget apparatus that sends to the management center, in the event of failure of the firmware rewriting in the target apparatus, failed firmware-identifying information for identifying a firmware program which has been used in the rewriting.

According to another aspect of the present invention, the image-processing system may further include a firmware-correcting unit in the management center that, upon receipt of the failed firmware-identifying information, corrects the firmware program which has been used in the rewriting on the basis of the failed firmware-identifying information.

According to another aspect of the present invention, both of the management communication apparatus and the image processor may function as the nontarget apparatus.

According to another aspect of the present invention, there is provided a method used in an image-processing system having an image processor which performs image input and output processing, and a management communication apparatus connected to the image processor and connected via a communication line to a management center, the method having: retaining, in a nontarget apparatus which is not subjected to firmware rewriting, firmware-identifying information for identifying a firmware program used before the firmware rewriting in a target apparatus which is subjected to firmware rewriting, and causing a controller to perform, in the event of failure of the firmware rewriting in the target apparatus, control operation to obtain the firmware program identified by the retained firmware-identifying information from the management center and perform firmware program rewriting in the target apparatus using the obtained firmware program.

According to another aspect of the present invention, the method may further include causing a sending unit in the nontarget apparatus to send to the management center, in the event of failure of the firmware rewriting in the target apparatus, failed firmware-identifying information for identifying a firmware program which has been used in the rewriting.

According to another aspect of the present invention, the method may further include causing a firmware-correcting unit in the management center, upon receipt of the failed firmware-identifying information, to correct the firmware program which has been used in the rewriting on the basis of the failed firmware-identifying information.

According to another aspect of the present invention, both of the management communication apparatus and the image processor may function as the nontarget apparatus.

According to another aspect of the present invention, there is provided a storage medium readable by a computer, the storage medium storing a program of instructions executable by the computer to perform a function for recovering from a firmware rewrite failure in an image-processing system having an image processor which performs image input or output processing and a management communication apparatus connected to the image processor and connected via a communication line to a management center, the function having: retaining, in a nontarget apparatus which is not subjected to firmware rewriting, firmware-identifying information for identifying a firmware program used before the firmware rewriting in a target apparatus which is subjected to firmware rewriting, and causing a controller to perform, in the event of failure of the firmware rewriting in the target apparatus, control operation to obtain the firmware program identified by the retained firmware-identifying information from the management center and perform firmware program rewriting in the target apparatus using the obtained firmware program.

According to another aspect of the present invention, the function may further include causing a sending unit in the nontarget apparatus to send to the management center, in the event of failure of the firmware rewriting in the target apparatus, failed firmware-identifying information for identifying a firmware program which has been used in the rewriting.

According to another aspect of the present invention, the function may further include causing a firmware-correcting unit in the management center, upon receipt of the failed firmware-identifying information, to correct the firmware program which has been used in the rewriting on the basis of the failed firmware-identifying information.

According to another aspect of the present invention, both of the management communication apparatus and the image processor may function as the nontarget apparatus.

Although embodiments of the present invention have been described with a certain degree of particularity using specific examples, it is to be understood that the invention is not limited thereto. It is further understood by those skilled in the art that various changes and modifications may be made in the invention without departing from the spirit and scope thereof.

What is claimed is:

1. An image-processing system in communication with a management center, the image-processing system having an image processor which performs image input or output processing, the image-processing system having a management communication apparatus connected to the image processor, the management communication apparatus being connected via a communication line to the management center, the image processing system comprising:
    a retaining unit, provided in a nontarget apparatus which is not subjected to firmware rewriting, that retains firmware-identifying information for identifying a firmware program used before rewriting in a target apparatus which is subjected to firmware rewriting; and
    a controller that, in the event of failure of the firmware rewriting in the target apparatus, obtains from the management center the firmware program identified by the firmware-identifying information retained in the retaining unit and performs firmware rewriting in the target apparatus using the obtained firmware program;
    wherein both of the management communication apparatus and the image processor function as the nontarget apparatus.

2. The image-processing system according to claim 1, further comprising:
    a sending unit in the nontarget apparatus that sends to the management center, in the event of failure of the firmware rewriting in the target apparatus, failed firmware-identifying information for identifying a firmware program which has been used in the rewriting.

3. The image-processing system according to claim 2, further comprising:
    a firmware-correcting unit in the management center that, upon receipt of the failed firmware-identifying information, corrects the firmware program which has been used in the rewriting on the basis of the failed firmware-identifying information.

4. A method used in an image-processing system in communication with a management center, the image-processing system having an image processor which performs image input and output processing, the image-processing system having a management communication apparatus connected to the image processor, the management communication apparatus being connected via a communication line to the management center, the method comprising:
    retaining, in a nontarget apparatus which is not subjected to firmware rewriting, firmware-identifying information for identifying a firmware program used before the firmware rewriting in a target apparatus which is subjected to firmware rewriting, and
    causing a controller to perform, in the event of failure of the firmware rewriting in the target apparatus, control operation to obtain the firmware program identified by the retained firmware-identifying information from the management center and perform firmware program rewriting in the target apparatus using the obtained firmware program, wherein both of the management communication apparatus and the image processor function as the nontarget apparatus.

5. The method according to claim 4, further comprising:
    causing a sending unit in the nontarget apparatus to send to the management center, in the event of failure of the firmware rewriting in the target apparatus, failed firmware-identifying information for identifying a firmware program which has been used in the rewriting.

6. The method according to claim 5, further comprising:
    causing a firmware-correcting unit in the management center, upon receipt of the failed firmware-identifying information, to correct the firmware program which has been used in the rewriting on the basis of the failed firmware-identifying information.

7. A storage medium readable by a computer, the storage medium storing a program of instructions executable by the computer to perform a function for recovering from a firmware rewrite failure in an image-processing system in communication with a management center, the image-processing system having an image processor which performs image input or output processing the image-processing system having a management communication apparatus connected to the image processor, the management communication apparatus being connected via a communication line to the management center, the function comprising:
    retaining, in a nontarget apparatus which is not subjected to firmware rewriting, firmware-identifying information for identifying a firmware program used before the firmware rewriting in a target apparatus which is subjected to firmware rewriting, and
    causing a controller to perform, in the event of failure of the firmware rewriting in the target apparatus, control operation to obtain the firmware program identified by the retained firmware-identifying information from the management center and perform firmware program rewriting in the target apparatus using the obtained firmware program, wherein both of the management communication apparatus and the image processor function as the nontarget apparatus.

8. The storage medium according to claim 7, wherein the function further comprises:
    causing a sending unit in the nontarget apparatus to send to the management center, in the event of failure of the firmware rewriting in the target apparatus, failed firmware-identifying information for identifying a firmware program which has been used in the rewriting.

9. The storage medium according to claim 8, wherein the function further comprises:
    causing a firmware-correcting unit in the management center, upon receipt of the failed firmware-identifying information, to correct the firmware program which has been used in the rewriting on the basis of the failed firmware-identifying information.

* * * * *